United States Patent [19]

Shaw et al.

[11] Patent Number: 4,769,050
[45] Date of Patent: Sep. 6, 1988

[54] LIQUID SEPARATOR ASSEMBLY

[75] Inventors: Frank W. Shaw; Richard F. Little, both of Columbus, Ind.

[73] Assignee: Arvin Industries, Inc., Columbus, Ind.

[21] Appl. No.: 52,547

[22] Filed: May 20, 1987

[51] Int. Cl.$^4$ ............................................. B01D 19/00
[52] U.S. Cl. ...................................... 55/171; 55/190; 55/319; 55/187; 55/441
[58] Field of Search ................ 55/170, 171, 190, 319, 55/441, 461, 174, 187, DIG. 17, DIG. 25

[56] References Cited

U.S. PATENT DOCUMENTS

| 2,205,336 | 6/1940 | Beach | 55/187 X |
| 3,312,044 | 4/1967 | McCarter | 55/174 X |
| 3,853,516 | 12/1974 | Lyshkow | 55/319 X |
| 3,887,032 | 6/1975 | Harris | 55/319 X |
| 3,923,480 | 12/1975 | Visch | 55/DIG. 25 X |
| 4,352,683 | 10/1982 | Vogel | 55/192 X |

OTHER PUBLICATIONS

Perry et al., "Chemical Engineer's Handbook", fourth edition, 1963, pp. 18-84 and 18-85.

Primary Examiner—Charles Hart
Attorney, Agent, or Firm—Barnes & Thornburg

[57] ABSTRACT

A liquid separator assembly for separating a liquid from a liquid-entrained vapor is provided. The separator assembly includes a housing having an interior wall that is configured to define a containment chamber. A downstream pipe is provided that is coupled to the housing and is in fluid communication with the containment chamber to discharge vapor from the housing. An upstream pipe is provided that is coupled to the housing and is in fluid communication with the containment chamber to introduce the liquid-entrained vapor into the housing. The upstream pipe is formed to include an expansion mechanism in the containment chamber for expanding and cooling the liquid-entrained vapor discharged in the containment chamber to induce condensation of the liquid entrained in the vapor onto the interior wall of the housing. A liquid return conduit is provided for conducting condensed liquid collecting in the containment chamber to a point of use.

9 Claims, 1 Drawing Sheet

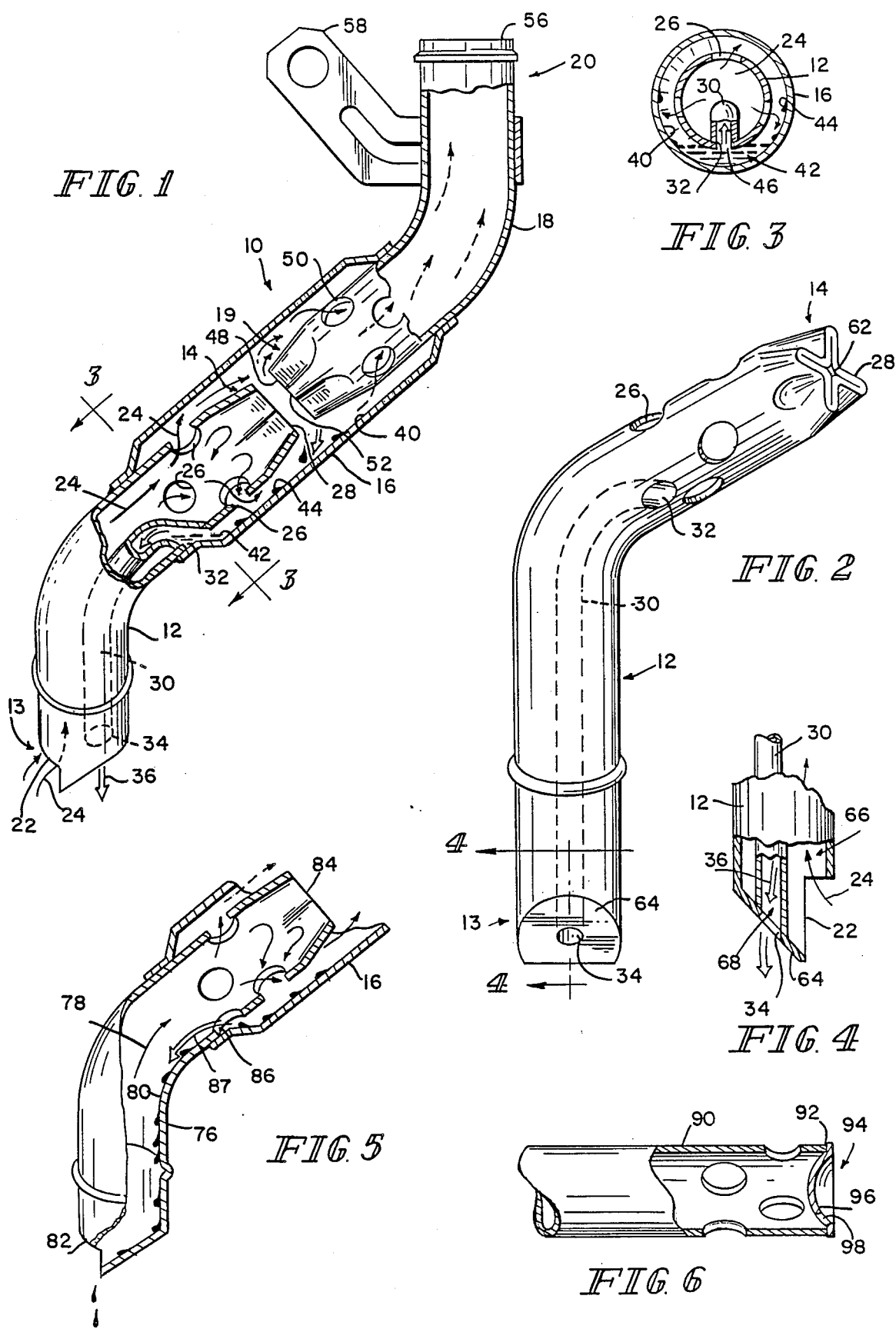

LIQUID SEPARATOR ASSEMBLY

BACKGROUND AND SUMMARY OF THE INVENTION

The present invention relates to liquid separators for separating liquid entrained in vapor. More particularly, the present invention relates to a liquid separator assembly that is utilized as an oil separator for separating oil entrained in vapor that is emitted from an internal combustion engine. The oil is separated from the vapor and returned to the engine for use.

Conventional devices for use on internal combustion engine for separating oil entrained in vapor emitted from the engine are generally complicated devices that include a series of internal baffles and pipes. By routing the oil-entrained vapor through the series of baffles and pipes, the oil is separated from the vapor, with the oil generally returned to the engine and the vapor then routed to further processing elements, normally a crankcase ventilation valve commonly referred to as a PCV valve. In addition to the complex nature of these conventional separators, the conventional separators generally route the separated oil back into the engine through a common conduit that is also serving to route the oil-entrained vapor into the separator.

One problem with conventional separators is that they are generally expensive to produce because of the complex nature of the internal baffles and pipes that are required to separate the oil from the vapor. Another problem with conventional separators is that, because the separated oil is returned to the engine through a common conduit that is also acting to channel the oil-entrained vapor into the separator, the separated oil may be picked up by the flow of oil-entrained vapor and returned to the separator. This causes the oil-entrained vapor routed from the engine to the separator to become more oil laden, which then decreases the efficiency of the oil separator.

One object of the present invention is to produce a simplified liquid separator that is capable of separating a liquid from a liquid-entrained vapor, and that is both simple and economical to construct.

Another object of the present invention is to provide a liquid separator in which specially designed end treatments of the inlet and outlet pipes are provided. The specially designed end treatments for the inlet and outlet pipes serve to replace the various baffles and tubes normally installed in conventional liquid separators.

Yet another object of the present invention is to provide a liquid separator that incorporates a separate oil return conduit within the separator assembly.

According to the present invention, a liquid separator assembly fulfilling the above objects is provided. The liquid separator assembly of the present invention includes a housing having an interior wall that is configured to define a containment chamber. The assembly also includes a downstream or outlet pipe that is coupled to the housing and is in fluid communication with the containment chamber to discharge vapor from the housing. An upstream or inlet pipe is provided that is coupled to the housing and is in fluid communication with the containment chamber to introduce liquid-entrained vapor into the housing. The upstream pipe is formed to include expansion means which are located in the containment chamber for cooling the liquid entrained vapor discharged into the containment chamber to induce condensation of the liquid in the vapor onto the interior wall of the housing. The assembly further includes liquid return means for conducting the condensed liquid collecting in the containment chamber to a point of use.

One feature of the foregoing structure is that the separator assembly comprises as few as three components to accomplish the separation of the liquid from the liquid-entrained vapor. One advantage of this feature is that the liquid separator assembly of the present invention is much simpler than conventional liquid separators, and is therefore less expensive to manufacture.

Another feature of the foregoing structure is that the upstream pipe is formed to include expansion means located in the containment chamber for cooling the liquid-entrained vapor to induce condensation of the liquid in the containment chamber. One advantage of this feature is that the expansion means is formed to be a part of the upstream pipe, which again simplifies the assembly.

Yet another feature of the foregoing structure is that a liquid return means is provided for conducting condensed liquid collected in the containment chamber back to a point of use. One advantage of this feature is that, by providing a separate liquid return means, the condensed liquid is returned to the point of use without any communication with the liquid-entrained vapor that is flowing into the assembly.

In preferred embodiments of the present invention, the liquid return means is provided by a return pipe that extends through the upstream pipe and is in fluid communication with the containment chamber. One feature of the foregoing structure is that the return pipe extends through the upstream pipe. One advantage of this feature is that, by forming the return pipe through the upstream pipe, the condensed liquid is maintained in a separate conduit from the inflow of liquid-entrained vapor, however no external conduits or pipes are necessary to accomplish this function.

Also in preferred embodiments of the present invention, the upstream pipe is formed to include at least one exit aperture for exhausting the liquid-entrained vapor into the containment chamber. In addition, the containment chamber has a predetermined volume that is selected to produce an air-cooling expansion in close proximity to the outside of the at least one exit aperture to induce condensation of liquid entrained in the vapor onto the interior wall of the housing. One feature of the foregoing structure is that, by providing a specially designed end treatment for the upstream pipe, and by forming the containment chamber to cooperate with the specialized end treatment, a vapor or air-cooling expansion is created which induces condensation of the liquid entrained in the air to separate the liquid from the air.

Also in preferred embodiments of the present invention, the downstream pipe is formed to include at least one inlet aperture for admitting vapor from the containment chamber into the downstream pipe. One feature of the foregoing structure is that the downstream pipe includes a specialized end treatment which acts in cooperation with the upstream pipe and the containment chamber to further separate the liquid from the liquid-entrained vapor. One advantage of this feature is that all components of the assembly cooperate to separate the liquid from the liquid-entrained vapor, thereby increasing the efficiency of the assembly.

Also in preferred embodiments of the present invention, the downstream pipe is formed to include funnel means for dispensing liquid accumulating in the downstream pipe into the containment chamber. One feature of the foregoing structure is that any liquid that is separated from the liquid-entrained vapor in the downstream pipe is channeled back into the containment chamber for admission to the return pipe. One advantage of this feature is that all oil separated in the assembly is channeled through the containment chamber and into the return pipe for return to the point of use.

The liquid separator assembly of the present invention is thus capable of separating a liquid from a liquid-entrained vapor and of returning the liquid to a selected point of use. By providing specialized end treatments for both the inlet pipe and the outlet pipe, the assembly of the present invention is less complex than the conventional separator assemblies, and is thereby less expensive to produce.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is an elevational view of the liquid separator assembly of the present invention with portions broken away;

FIG. 2 is an elevational view of the upstream pipe member of the assembly;

FIG. 3 is a transverse sectional view taken along lines 3—3 of FIG. 1;

FIG. 4 is a transverse sectional view taken along lines 4—4 of FIG. 2;

FIG. 5 is an illustration of an alternate embodiment of the present invention with portions broken away; and FIG. 6 is an illustration of an alternate embodiment of the upstream and downstream pipe members of the present invention with portions broken away.

DETAILED DESCRIPTION OF THE DRAWINGS

Referring now to the drawings, and particularly to FIG. 1, FIG. 1 shows a liquid separator assembly 10 according to the present invention. Although the liquid separator assembly 10 may be used in several environments, and may be utilized to separate different types of liquid from various types of liquid-entrained vapor, the embodiment illustrated is utilized on an internal combustion engine (not shown) and functions to separate oil from oil-entrained air that is vented from the crankcase (not shown) of the internal combustion engine, with the air then routed to a crankcase ventilation valve, normally referred to as a PCV valve (not shown). Therefore the liquid separator assembly 10 in this embodiment acts as an oil separator and will be referred to as an oil separator assembly 10.

The oil separator assembly 10 includes a lower, inlet or upstream pipe 12 that includes an inlet end 13 and an outlet end 14. The inlet end 13 is configured to be mounted into the crankcase (not shown) of an internal combustion engine (not shown) such that the inlet end 13 is sealed within the crankcase. The outlet end 14 is disposed within a housing that forms a containment chamber or containment cylinder 16, with the containment cylinder 16 sealed around an external portion of the upstream pipe 12.

The assembly 10 also includes an upper, outlet or downstream pipe 18. The downstream pipe 18 includes an inlet end 19 that, like the outlet end 14 of the upstream pipe 12, is sealingly disposed within the containment cylinder 16. The downstream pipe 18 also includes an outlet end 20. The outlet end 20 of the downstream pipe 18 is configured to channel the air toward the PCV valve (not shown) after the oil has been separated from the oil-entrained air.

The upstream pipe 12, and specifically the inlet end 13 of the upstream pipe 12, is configured to include an air inlet opening 22 that communicates with the interior of the crankcase (not shown) to receive the oil-entrained air from the crankcase. The oil-entrained air flows into the air inlet opening 22 as indicated by the solid arrows 24.

Outlet apertures 26 are formed in the outlet end 14 of the upstream pipe 12. The outlet apertures 26 are formed in the sides of the upstream pipe 12, such that for the oil-entrained air to exit through the outlet apertures 26, the air must turn approximately 90°. This flow of the oil-entrained air out of the outlet apertures 26 is also indicated by the solid arrows 24. The extreme end of the outlet end 14 is substantially blocked by forming a flow control end 28. The details of the flow control end 28 will be discussed later, however the flow control end 28 is formed such that substantially all of the flow of the oil-entrained air toward the outlet end 14 of the upstream pipe 12 is diverted through the outlet apertures 26.

An oil return conduit 30 is formed within the interior of the upstream pipe 12. The oil return conduit 30 includes an oil inlet port 32 that is disposed in an upper portion of the upstream pipe 12, at a location just inside the containment cylinder 16. An oil outlet port 34 is disposed adjacent the inlet end 13 of the upstream pipe 12. The oil outlet port 34 is separate from the air inlet opening 22 such that the in-flowing air and the out-flowing oil are directed away from each other. The out-flowing oil from the oil return conduit 30, and specifically the oil outlet port 34, is indicated by the double line arrows 36.

The containment cylinder 16 surrounds both the outlet end 14 of the upstream pipe 12 and the inlet end 19 of the downstream pipe 18. The containment cylinder 16 is formed to include a containment cylinder interior wall 40 that completely surrounds both of these portions of the upstream pipe 12 and downstream pipe 18. Because the assembly 10 is mounted substantially in the orientation shown in FIG. 1, the bottom portion of the containment cylinder 16 forms a collection basin 42. The collection basin 42 is configured to collect the separated oil and channel it into the oil inlet port 32 of the oil return conduit 30.

The downstream pipe 18, and specifically the inlet end 19 of the downstream pipe 18, is closed by a flow control end 48. A series of air inlet apertures 50 is formed around the inlet end 19, substantially adjacent the flow control end 48. An oil outlet opening 52 is formed in the flow control end 48, the use of which will be discussed later. The outlet end 20 of the downstream pipe 18 is configured to include a treated air outlet opening 56. The air outlet opening 56 is configured to channel the treated air toward the PCV valve (not shown). A mounting bracket 58 is attached to the downstream pipe 18 at a location near the treated air outlet opening 56. The mounting bracket 58 is utilized to attach the assembly 10 to an exterior portion of the internal combustion engine (not shown) to securely mount the assembly 10 to the engine.

FIG. 2 shows in more detail the configuration of the upstream pipe 12. Specifically, FIG. 2 shows the orientation of the outlet apertures 26 that are spaced around the wall of the upstream pipe 12, near the flow control end 28. Also, details of the flow control end 28 can be seen in FIG. 2. Specifically, the flow control end 28 is formed by crimping the outlet end 14 of the upstream pipe 12 to substantially close the outlet end 14. When crimped, the flow control end 28 is formed to include an opening 62 substantially near its center. The dimensions of the opening 62 are maintained between 2.0 millimeters to 5.0 millimeters. Although not shown in the drawings, the oil outlet opening 52 formed in the inlet end 19 of the downstream pipe 18 is also of identical dimensions to the opening 62.

FIG. 2 also shows in somewhat greater detail the orientation of the oil return conduit 30 and its positioning within the interior of the upstream pipe 12. In addition, the oil outlet port 34 is shown in greater detail disposed on a beveled face 64 that is part of the inlet end 13.

FIG. 3 shows in more detail the orientation of the oil return conduit 30 and the oil inlet port 32 within the upstream pipe 12 and containment cylinder 16. As the separated oil collects on the interior wall 40 of the containment cylinder 16, because of the orientation of the assembly 10, the oil droplets 44 migrate by gravity to the collection basin 42. From there, the oil 44 flows into the oil inlet port 32 as indicated by the arrow 46.

In use, the oil separator assembly 10 is mounted on an internal combustion engine (not shown) generally in the orientation shown in FIG. 1. The inlet end 13 is sealingly disposed into the crankcase (not shown) of the engine. The mounting bracket 58 is attached to an external member (not shown) on the engine to provide for rigid attachment of the assembly 10 to the engine. The treated air outlet opening 56 is coupled to a PCV valve (not shown) to complete the assembly. As the engine operates, heat builds up within the crankcase which creates oil-entrained air under pressure within the crankcase. This oil-entrained air, because of its higher pressure, flows into the air inlet opening 22 as indicated by the arrows 24, and flows upwardly toward the flow control end 28 of the upstream pipe 12.

Because the flow control end 28 is substantially closed, the in-flow of oil-entrained air is forced to flow outwardly through the outlet apertures 26. Because of the closed flow control end 28, and the pressure of the in-flowing air, as the oil-entrained air flows outwardly through the outlet apertures 26 into the interior of the containment cylinder 16, the oil entrained air is permitted to expand.

By expanding, the oil-entrained air cools somewhat as it enters the interior of the containment cylinder 16. Because of this cooling due to expansion, the oil contained within the oil-entrained air condenses on the interior wall 40 of the containment cylinder 16. The separated oil is indicated by the number 44 and is shown collecting on the bottom portion of the interior wall 40. The air then enters the air inlet apertures 50 in the downstream pipe 18 as it continues upwardly toward the outlet opening 56.

Because the downstream pipe 18 is separated from the engine somewhat, the downstream pipe 18 is somewhat cooler in temperature than the upstream pipe 12. Thus, as the air contacts the downstream pipe 18 as it enters the air inlet apertures 50, further cooling of the air takes place. Thus, any oil still entrained in the air is further condensed within the interior of the downstream pipe 18, and specifically within the inlet end 19. This further separated oil then flows by gravity toward the opening 52 in the flow control end 48 of the downstream pipe 18. The oil flowing out of the oil outlet opening 52 joins the oil collected on the interior wall 40 of the containment cylinder 16, and flows toward the collection basin 42 in the containment cylinder 16. The air then continues upwardly toward the vapor outlet opening 56 in the downstream pipe 18 and is routed to the PCV valve for further processing. Because of the action of the separator assembly 10, substantially all of the oil is removed from the oil-entrained air that enters the assembly 10.

As stated previously, the oil 44 separated from the oil-entrained air collects on the interior wall 40 of the containment cylinder 16, and travels by gravity toward the collection basin 42. As the oil 44 collects in the collection basin 42, it enters the oil return conduit 30 through the oil inlet port 32. Again because of gravity, the oil 44 then flows through the oil return conduit 32 toward the oil outlet port 34 disposed in the beveled face 64. Because of the orientation of the separator assembly 10, the oil exits the oil outlet port 34 and flows into the crankcase of the engine to be reused. Because of the orientations of the air inlet opening 22 and the oil outlet port 34, the in-flowing oil-entrained air or vapor does not substantially interfere with the out-flowing separated oil from the oil outlet port 34. By separating the returning oil from the in-flowing air, the returning oil is permitted to flow into the crankcase of the engine, without the possibility of being picked up by the in-flowing air and forced upwardly toward the containment cylinder 16.

FIG. 4 shows in greater detail the orientation of the air inlet opening 22 and the oil outlet port 34. FIG. 4 also shows the orientation of the oil return conduit 30 within the upstream pipe 12. As shown, the oil outlet port 34 is oriented to discharge separated oil separate from the in-flow of the air into the air inlet opening 22. This orientation eliminates any interference between the out-flowing oil from the oil outlet port 34 and the in-flowing air through the air inlet opening 22. In addition, FIG. 4 shows the difference in relative sizes of a space 68 within oil return conduit 30 and a space 66 within the upstream pipe 12 for conducting the in-flowing vapor.

Specifically, the space 66 available for the in-flowing vapor within the upstream pipe 12 is considerably greater than the size of the space 68. Thus, the oil-entrained air in the crankcase will normally follow a path of least resistance as it travels upwardly through the upstream pipe 12. Because of the greater size of the space 66, the air will thus travel through the air inlet opening 22, as opposed to the path through the oil return conduit 30. This relationship thus prevents the in-flowing oil-entrained air from flowing upwardly through the oil return conduit 30, which could detrimentally affect the efficiency of the assembly 10.

FIG. 5 shows an alternative embodiment of the present invention in which the oil return conduit has been eliminated. In this embodiment, an upstream pipe 76 is provided which includes a combined vapor inlet and oil outlet opening 82. The upstream pipe 76 is formed to include a flow control end 80, similar to the flow control end 28. In this embodiment, oil-entrained air or vapor flows upwardly through the inlet 82 and enters the containment chamber 16 as in the embodiment shown in FIG. 1. As the oil is separated from the oil-entrained air, the oil flows by gravity into one of the apertures 86 of the upstream pipe 76, and then flows down the interior of the upstream pipe 76 as indicated by the double arrow 87 toward the vapor inlet and oil outlet opening 82. The oil then enters the crankcase through the opening 82. Thus, the separated oil flows down the same conduit as the inflowing oil-entrained air. All other aspects of this embodiment function as in the embodiment illustrated in FIG. 1.

FIG. 6 shows an alternative embodiment of the end treatment of both the upstream pipe 12 and the downstream pipe 18. Specifically, FIG. 6 shows an alternative to the flow control end 28 of the upstream pipe 12, and the flow control end 48 of the downstream pipe 18. The crimping to form the flow control ends 28, 48, is eliminated and is replaced by a cap 96 that is inserted into the end 92 of a pipe 90. The cap 96 is illustratively a cup-shaped circular plate having an outwardly extending rim. The rim mates with the end 92 of the pipe 90, and may be firmly attached to the end 92 by any suitable method. Illustratively, the cap 96 may be welded (not shown) to the end 92 in two or more places.

To replace the function of the oil outlet opening 52 in the downstream pipe 18, a hole 98 is formed in a lower portion of the cap 96 to permit oil (not shown) collecting in the pipe 90 to flow outwardly through the opening 98 and into the containment cylinder 16. Illustratively, the hole 98 is formed to have a size of between 2.0 millimeters and 4.0 millimeters. Thus, the pipe 90 illustrated in FIG. 6 can be substituted for both the upstream pipe 18 and the downstream pipe 12 in the assembly 10, and the assembly 10 will function similar to the embodiment illustrated in FIG. 1.

Although the invention has been described in detail with reference to certain preferred embodiments, variations and modifications exist within the scope and spirit of the invention as described and defined in the following claims.

What is claimed is:
1. A liquid separator assembly comprising
  a housing means having an interior wall configured to define a containment expansion chamber means, surrounded by an environment to be at a relatively cool temperature,
  inlet means for admitting liquid-entrained vapor into the housing means from a relatively warmer vapor source than is said surrounding environment,
  outlet means for discharging air from the housing means to a first point of use,
  opening means located in the inlet means for directly passing the liquid entrained vapor from the inlet means into the containment expansion chamber means whereby said liquid entrained vapor is expanded through the opening means and condenses against said interior wall for separating liquid from the liquid-entrained air admitted into the housing means through the inlet means, and wherein said separated liquid collects in the housing means, and
  passageway means situated within the inlet means for conducting said separated liquid collected in said housing means to a second point of use through a portion of the inlet means.

2. The assembly of claim 1, wherein the inlet means includes a first tube having an interior region interconnecting said vapor source and said containment expansion chamber means via said opening means and wherein said passageway means includes a second tube extending through the interior region of the first tube to conduct separated liquid from said housing means to the second point of use without intermixing said liquid-entrained vapor conducted through the first tube and said separated liquid.

3. The assembly of claim 1, wherein the inlet means includes a first tube having a distal portion situated in said housing and also formed with at least one exit aperture means for additionally exhausting liquid-entrained vapor into said containment expansion chamber.

4. The assembly of claim 3, wherein the containment expansion chamber has predetermined volume selected to cooperate with said at least one exit aperture means to also provided additional expansion for the vapor and for defining an air-cooling expansion region in the containment chamber just outside the at least one exit aperture means to induce condensation of liquid entrained in the vapor flowing through the exit aperture means on the interior wall of the housing.

5. The assembly of claim 3, wherein the first tube includes an annular side wall for channeling liquid-entrained vapor along a path into the housing, said annular side wall locating said opening means which include at least one exit aperture means, and an end wall substantially blocking the flow of air through the first tube so that said vapor is diverted to flow at an angle to said path and exhausted through the at least one exit aperture means into said containment expansion chamber means.

6. The assembly of claim 3, wherein the outlet means includes a second air-conducting tube having a distal end portion situated in the housing and formed to include at least one inlet aperture means for admitting air from the containment expansion chamber into the second air-conducting tube for subsequent discharge to the first point of use.

7. The assembly of claim 6, wherein the distal portions of the first and second tubes are situated in spaced-apart relation, and the interior wall is configured to define a liquid collection basin in the containment expansion chamber underlying both said distal portions and communicating with the passageway means for conducting the separated liquid in the basin to the second point of use via the passageway means.

8. The assembly of claim 6, wherein the distal portion of the second air-conducting tube includes an annular side wall formed to include said at least one inlet aperture means and an end wall substantially blocking the flow of air into the second air-conducting tube and wherein the end wall includes funnel means for dispensing liquid accumulating in the second air-conducting tube into the containment chamber.

9. The assembly of claim 1, wherein the at least one aperture means for conducting air from the containment chamber into said second tube is of smaller cross-section size than the cross-section of the second tube wherein said at least one aperture means causes expansion of the air flowing therethrough.

* * * * *